Dec. 12, 1950 A. A. CONKLIN ET AL 2,533,715
EXPANSIBLE TUBE PLUG
Filed Nov. 26, 1946
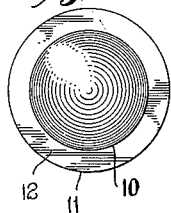
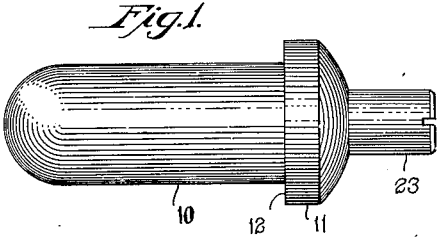
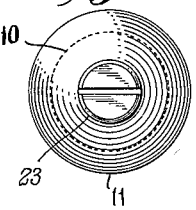
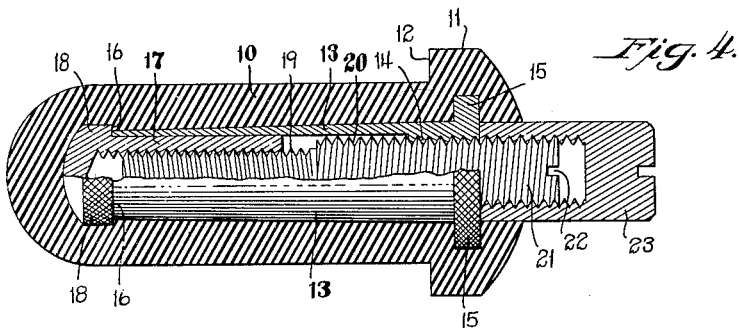
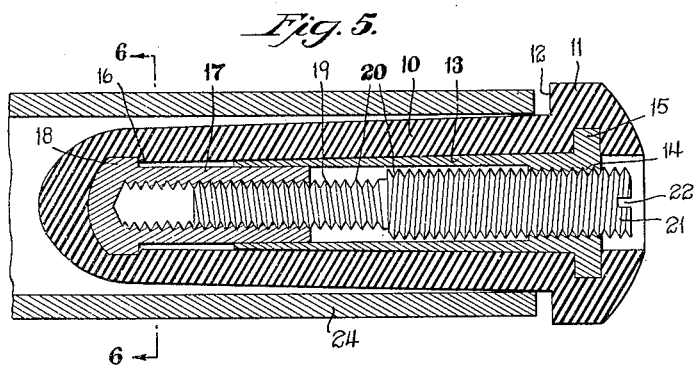
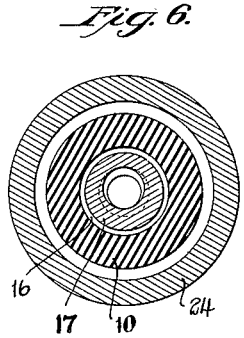
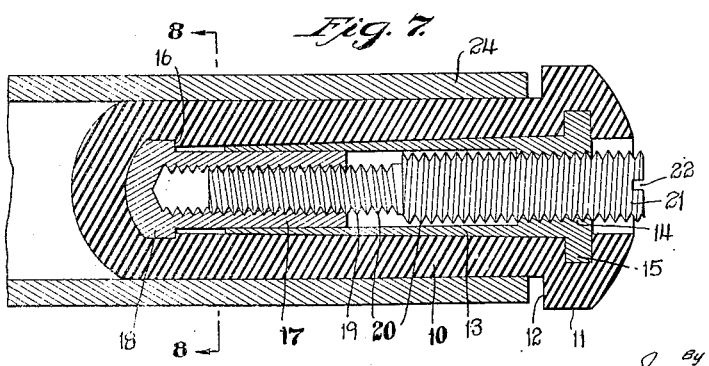
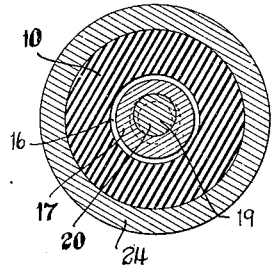
Inventors
Alfred A. Conklin
Raymond G. Sherman
by Seymour Earle & Nichol,
Attorneys Patented Dec. 12, 1950

2,533,715

UNITED STATES PATENT OFFICE 2,533,715

EXPANSIBLE TUBE PLUG

Alfred A. Conklin, West Haven, and Raymond G. Sherman, North Haven, Conn.

Application November 26, 1946, Serial No. 712,290

3 Claims. (Cl. 220—24.5)

This invention relates to an improvement in tube-plugs and particularly to plugs for insertion into ends of condenser tubes which, from some cause, leak.

The object of this invention is to form a plug which may be readily inserted into the end of a condenser tube and adjusted to close the end of such a tube.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a side view of a plug embodying my invention;

Fig. 2 is an inner end view of the same;

Fig. 3 is an outer end view;

Fig. 4 is a longitudinal sectional view partly in elevation;

Fig. 5 is a longitudinal sectional view showing the plug inserted into a tube;

Fig. 6 is a sectional view on the line 6—6 of Fig. 5;

Fig. 7 is a sectional view, like Fig. 5, showing the plug expanded; and

Fig. 8 is a sectional view on the line 8—8 of Fig. 7.

The plug as illustrated in the drawings includes a cylindrical body-member 10 of molded rubber or other suitable material having at its outer end a head 11 which provides an annular stop-shoulder 12 to limit the distance the plug may be inserted into a tube.

Axially molded in the interior of the body-member 10 is a tubular sleeve 13 having its outer periphery inwardly tapered and its axial bore provided at its outer end with internal left-hand threads 14. Also at the outer end thereof, the sleeve 13 is formed with an annular anchoring-flange 15 embedded in the head-portion of the body-member 10 and having its outer surface knurled or otherwise roughened so as to firmly hold the sleeve 13 against any turning movement with respect to the body-member. The flange 15 also serves to prevent any axial displacement of the sleeve 13 relative to the body-member 10, for the purpose as will hereinafter appear.

A tubular nut 17 formed with a shoulder 16 is also molded in the body-member 10 axially with respect to both the said body-member and sleeve 13.

At the inner end of the nut 17 is formed an anchoring-head 18, the outer face of which constitutes the shoulder 16 before referred to. The body-portion of the nut 17 is of a diameter to freely fit within the smooth unthreaded inner portion of the sleeve 13. Like the flange 15 of the sleeve 13, the head 18 is knurled or otherwise roughened so as to firmly anchor the nut 17 against any turning movement relative to the body-member. The nut 17 is provided axially with right-hand threads for threaded engagement with the similarly-threaded shank 19 of a screw 20.

The screw 20, in addition to the right-hand threaded shank 19, has its body-portion 21 provided with left-hand threads coacting with the left-hand threads 14 of the sleeve 13. At its outwardly-projecting end, the body-portion 21 is provided with a kerf 22 for the reception of a screw driver or other suitable tool.

As shown in Fig. 4, when the elements above described are assembled for molding the body-member 10, an internally-threaded cap 23 is threaded over the projecting outer end of the body-portion 21 of the screw 20 and serves at this time to protect the exposed threads of the screw 20 from being molded into the body-member. The cap 23 also serves to protect the threads of the screw 20 from harm when the plug is not in use.

When it is desired to use the plug to close off a tube, the screw 20 is threaded into the body-member, causing the sleeve 13 and nut 17 to axially move away from each other. This separation of these two elements will cause an extension of the body-member 10, thereby increasing the over-all length of the body-member, while at the same time decreasing its diameter.

When the diameter of the body-member is small enough to enter a condenser tube such as 24 (Fig. 5), the plug is inserted to a sufficient depth or until the shoulder 12 engages the end of the tube. The screw 20 may now be backed-off, drawing the sleeve 13 and nut 17 axially together, thus permitting the body-member to axially contract and expand its diameter until this expansion is arrested by the engagement of the body-member with the interior wall of the tube 24 (Fig. 7).

The continued unthreading or backing-off of the screw 20 will forcibly further expand the body-member 10 into firm gripping engagement with the interior of the tube 24 and effectively close the otherwise open end of the tube.

When it is desired to remove the plug, the screw 20 is threaded into the plug, to again extend and decrease the diameter of the body-member 10, allowing the removal of the plug.

It will thus be seen that the plug of the present invention readily and effectively may be inserted in a tube to plug or close the end thereof or to be removed therefrom.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. A tube plug comprising a molded rubber body closed at one end and having an axial aperture intersecting its opposite open end; and means mounted in the axial aperture of said body for positively expanding and contracting said plug laterally, said means comprising an internally-threaded sleeve molded in situ in the open end of said body, an internally-threaded nut molded in situ the closed end of said body in axial alignment with said sleeve, the threads of said nut being reverse to the threads of said sleeve, and an externally-threaded screw in the open end of said body, said screw having reversely-threaded sections arranged to engage said threaded sleeve and said threaded nut respectively to move said sleeve and nut axially simultaneously and in opposite directions thereby to positively elongate and positively contract the rubber body of said plug.

2. A tube plug comprising a molded rubber body closed at one end and having an axial aperture intersecting its opposite open end; an integral flanged head on said body at its open end; and screw-threaded means mounted in the axial aperture of said body for positively expanding and contracting the molded rubber body laterally, said screw-threaded means comprising an internally-threaded sleeve molded in situ in the flanged head of said body, an internally-threaded nut molded in situ in the closed end of said body in axial alignment with said sleeve, the threads of said nut being reverse to the threads of said sleeve, and an externally-threaded screw in the open end of said body, said screw having reversely-threaded sections arranged to engage said threaded sleeve and said threaded nut respectively to move said sleeve and nut axially simultaneously and in opposite directions thereby to positively elongate and positively contract the rubber body of said plug.

3. A tube plug comprising a molded rubber body closed at one end and having an axial aperture intersecting its opposite open end; an integral flanged head on said body at its open end; and screw-threaded means mounted in the axial aperture of said body for positively expanding and contracting the molded rubber body laterally, said screw-threaded means comprising an internally-threaded sleeve having a flange at one end molded in situ in the flanged head of said rubber body, an internally-threaded nut having a flange at one end molded in situ in the closed end of said body, said nut being in axial alignment with said sleeve and the threads of said nut being reverse to the threads of said sleeve; and an externally-threaded screw in the open end of said body, said screw having reversely-threaded sections arranged to engage said threaded sleeve and said threaded nut respectively to move said sleeve and nut axially simultaneously and in opposite directions thereby to positively elongate and positively contract the rubber body of said plug.

ALFRED A. CONKLIN.
RAYMOND G. SHERMAN.

REFERENCES CITED

The following references are of record in the file of this patent:

UNITED STATES PATENTS

| Number | Name | Date |
|---|---|---|
| 778,068 | Peterson | Dec. 20, 1904 |
| 922,544 | Turner et al. | May 25, 1909 |
| 2,062,519 | Ljungberg | Dec. 1, 1936 |
| 2,355,492 | White | Aug. 8, 1944 |
| 2,374,947 | Nicholson | May 1, 1945 |